Nov. 30, 1926.

R. BRUENIG

BAIT

Filed Dec. 30, 1925

1,609,151

Richard Bruenig
INVENTOR.

Victor J. Evans
ATTORNEYS.

Patented Nov. 30, 1926.

1,609,151

UNITED STATES PATENT OFFICE.

RICHARD BRUENIG, OF PERU, ILLINOIS.

BAIT.

Application filed December 30, 1925. Serial No. 78,407.

This invention relates to improvements in artificial bait for catching fish and which in configuration closely resembles a fish in order that larger fish would swallow the bait.

Another object of my invention resides in the specific construction of the invention per se constituting a bolt mounted for longitudinal sliding movement within the bait against the tension of spring means included therein and during such operation throws barbs outwardly from the bait in order that the fish so swallowing the bait will be prevented from dispensing with the bait after swallowing the same.

A further object of my invention resides in the provision of a shaft extending outwardly from the bolt in advance of the bait and having a spring finger included thereon adapted to engage the forward end of the bait when the bolt is pulled outwardly with the fishing line whereby the said barbs will be locked in an outwardly extended position within the fish caught.

With the above and other objects in view, the invention further includes the following novel features and details of construction, to be hereinafter more fully described, illustrated in the accompanying drawings and pointed out in the appended claims.

In the drawing—

Figure 1:
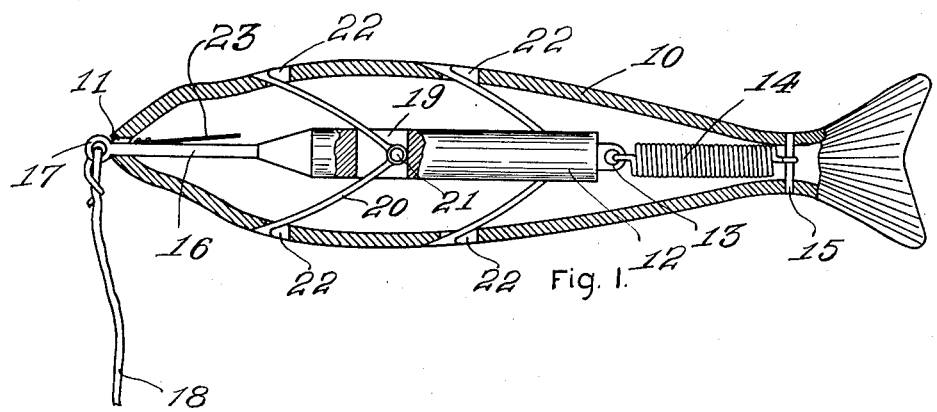
Figure 1 is a longitudinal sectional view taken through my invention.

Referring to the drawing in detail, wherein like characters of reference denote corresponding parts, the reference character 10 indicates a hollow bait and which in configuration closely resembles a fish or minnow and including an opening 11 in the forward end thereof. A bolt 12 being positioned within the bait 10 and providing a reduced and apertured lug 13 upon its inner end for receiving the forward end of a contraction for retractile spring 14 which in turn having its opposite end connected to a pin 15 within the bait 10. The forward end of the bolt 12 having a reduced extension 16 protruding therefrom and extending through the opening 11 and terminating at its outer extremity in an eye 17 for securing a fish line 18 thereto. The bolt further including transversely disposed elongated slotted portions 19 therein at appropriate points in its length within which the inner ends of barbs 20 are pivotally secured as indicated at 21 which in turn having their outer ends protruding through slotted portions 22 provided in the opposite sides of the bait 10.

Figure 2:
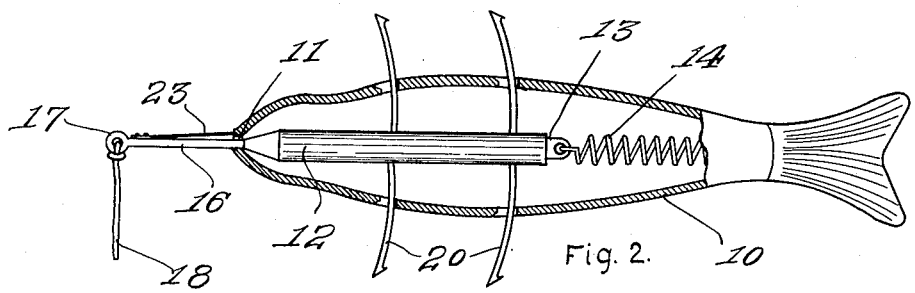
Figure 2 is a similar view with the barbs extended.
Figure 3:
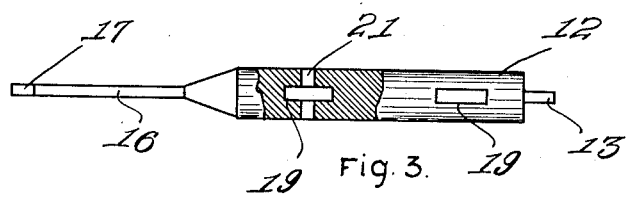
Figure 3 is a fragmentary side elevation of the bolt.

In the use and operation of the present invention it is clearly apparent and manifest that when the bait 10, which is of sufficient weight in and of itself capable of being thrown overboard, as in the instance of a sinker and being so configured and alluring as to closely resemble a minnow and which when swallowed by a fish of much larger proportions the fishing line is then pulled and the barbs 20 extended outwardly as clearly illustrated in Figure 2 of the drawing and held in such position through the instrumentality of a spring finger 23 arranged upon one side of the reduced extension 16 and having its opposite end engaging the forward end of the bait 10 adjacent the opening 11. Manifestly the said barbs 20 will be sustained in such position while hauling in the catch and such bait quickly released and withdrawn from the fish upon compressing the spring finger 23 against the reduced extension 16 whereby the said spring finger 23 will be inserted within the opening 11 and the action of the spring 14 will then take place and the barbs 20 will spring inwardly, as clearly illustrated in figure 1 of the drawing.

The invention is susceptible of various changes in its form, proportions and minor details of construction, and the right is herein reserved to make such changes as properly fall within the scope of the appended claim.

Having thus described the invention, what is claimed is:—

A fishing bait of the character described being of hollow construction and having an opening provided within its forward end, a bolt included within the bait and having a reduced extension provided upon its forward end protruding through the opening provided in the forward end of the bait, a retractile spring having one end anchored within the bait and the opposite end secured to the inner end of the bolt, a plurality of barbs having their inner ends pivotally secured within the bolt and their opposite ends extending through openings provided upon diametrically opposite sides of the bait, and a spring finger secured to one side of the reduced extension and having its opposite end brought into engagement with the outer surface and forward end of the bait upon a forward longitudinal sliding movement of the bolt whereby the barbs will be sustained in outwardly extending positions to prevent loss of a catch.

In testimony whereby I affix my signature.

RICHARD BRUENIG.